US010498392B2

(12) United States Patent
Tiebout et al.

(10) Patent No.: US 10,498,392 B2
(45) Date of Patent: Dec. 3, 2019

(54) RADIO FREQUENCY DEVICE AND CORRESPONDING METHOD

(71) Applicant: Infineon Technologies AG, Neubiberg (DE)

(72) Inventors: Marc Tiebout, Finkenstein (AT); Michele Caruso, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/845,746

(22) Filed: Dec. 18, 2017

(65) Prior Publication Data
US 2018/0175909 A1 Jun. 21, 2018

(30) Foreign Application Priority Data
Dec. 19, 2016 (DE) .......................... 10 2016 124 785

(51) Int. Cl.
*H04B 3/462* (2015.01)
*H04B 17/12* (2015.01)
*H04B 17/00* (2015.01)
*H04B 17/14* (2015.01)

(52) U.S. Cl.
CPC ......... *H04B 3/462* (2013.01); *H04B 17/0085* (2013.01); *H04B 17/12* (2015.01); *H04B 17/14* (2015.01)

(58) Field of Classification Search
CPC .... H04B 17/0085; H04B 17/14; H04B 17/12; H04B 17/11; H04B 17/21; H04B 3/462
See application file for complete search history.

(56) References Cited

U.S. PATENT DOCUMENTS

| 2006/0145919 A1* | 7/2006 | Pleva | H01Q 1/3283 342/368 |
| 2007/0093274 A1* | 4/2007 | Jafarkhani | H04B 7/0617 455/562.1 |
| 2014/0004801 A1* | 1/2014 | Cohen | H04B 17/12 455/67.16 |

(Continued)

FOREIGN PATENT DOCUMENTS

| CN | 1439899 A | 9/2003 |
| CN | 104597323 A | 5/2015 |

(Continued)

OTHER PUBLICATIONS

Jo, Ohyun et al., "Holistic Design Considerations for Environmentally Adaptive 60 GHz Beamforming Technology," IEEE Communications Magazine, Nov. 2014, pp. 30-38.

(Continued)

*Primary Examiner* — Aristocratis Fotakis
(74) *Attorney, Agent, or Firm* — Slater Matsil, LLP

(57) ABSTRACT

Devices and methods determining phase offsets are disclosed. A first test signal is transmitted from a first RF circuit part to a second RF circuit part, where a phase difference between the first test signal and a reference signal (ref) is measured. A second test signal is transmitted from the second RF circuit part to the first RF circuit part, where a second phase difference between the second test signal and the reference signal (ref) is measured. Phase offsets of a connection between the first and second circuit parts or of a line supplying the reference signal are determined based on the first and second phase differences.

17 Claims, 4 Drawing Sheets

(56) References Cited

U.S. PATENT DOCUMENTS

| | | | | |
|---|---|---|---|---|
| 2014/0097986 A1* | 4/2014 | Xue | ............... | H01Q 3/34 |
| | | | | 342/372 |
| 2014/0192916 A1* | 7/2014 | Gomadam | ........... | H04B 7/0469 |
| | | | | 375/267 |
| 2014/0242914 A1* | 8/2014 | Monroe | ................ | H04B 17/11 |
| | | | | 455/63.4 |
| 2014/0348035 A1 | 11/2014 | Corman et al. | | |
| 2015/0255868 A1* | 9/2015 | Haddad | ................ | H01Q 3/267 |
| | | | | 342/368 |
| 2016/0269008 A1* | 9/2016 | Facchini | .................. | H03K 5/13 |
| 2017/0324419 A1* | 11/2017 | Mayer | ................ | H03L 7/0891 |

FOREIGN PATENT DOCUMENTS

| | | |
|---|---|---|
| DE | 112009000053 T5 | 10/2010 |
| DE | 102010011429 A1 | 9/2011 |

OTHER PUBLICATIONS

Kanar, Tumay et al., "A 2-15 GHz Built-in-Self-Test System for Wide-band Phased Arrays Using Self-Correcting 8-State I/Q Mixers," IEEE MTT-S International Microwave Symposium (IMS), May 22-27, 2016, 4 pages.

Kim, Sang Y. et al., "A 76-84 GHz 16-Element Phased Array Receiver with a Chip-Level Built-In-Self-Test System," RMO2D-4, IEEE Radio Frequency Integrated Circuits Symposium, vol. 61, Issue 8, 99. 127-130, Aug. 2012.

"Transmit/Receiver Modules, Microwave101," The world's microwave information resource since 2001, Microwave101.com; https://www.microwaves101.com/encyclopedias/transmit-receive-modules; 5 pages, print Nov. 8, 2017.

* cited by examiner

RADIO FREQUENCY DEVICE AND CORRESPONDING METHOD

This application claims the benefit of German Application No. 102016124785.5, filed on Dec. 19, 2016, which application is hereby incorporated herein by reference in its entirety.

TECHNICAL FIELD

The present application generally relates to radio frequency (RF) devices, systems and methods.

BACKGROUND

Phased array transmit/receive systems are an example for RF systems desired for many application such as broadcasting, radar, space communication, weather research, optics, radio frequency (RF) identification systems and tactile feedback systems. Such systems may also be used for gesture sensing, communication backhauling and high speed routing in wireless gigabit (WiGig) or other consumer wireless systems.

A phased array system comprises an array of antennas in which relative phases and amplitudes of a plurality of signals transmitted over the antennas or received via the antennas may be adjusted. This adjustment may be performed in various pails of the systems and devices, for example RF, intermediate frequency (IF) or baseband (BB) parts, before or after analog-to-digital or digital-to-analog conversion etc. By proper adjustment, an effective radiation pattern of the array may be formed in a desired manner, which is also referred to as beamshaping. This beamshaping of the radiation pattern occurs due to constructive and destructive interference between the signals transmitted by each antenna of the array of antennas. Through adjustable phase and amplitude relationships, so-called beamsteering may be performed, i.e. the radiation pattern may be modified also during transmission. Reception may be done in a similar manner, thus providing a reception sensitive to a particular radiation pattern, for example to radiation from a particular direction.

One type of phased arrays is a dynamic phased array. In a dynamic phased array, each signal path providing a signal to an antenna incorporates an adjustable phase shifter, and these adjustable phase shifters may for example collectively be used to move a radiation beam. Moreover, the signal paths may comprise adjustable amplifiers, which provide further adjustment possibilities. Such adjustable phase shifters and/or amplifiers may exhibit variations in the behavior for example due to process variations or temperature variations. This influences the accuracy of a radiation pattern generated or received and/or may influence the accuracy of beamsteering. Generally, for exact beamsteering exact phase relationship between various signal paths are required.

In such phased arrays, reference clock signals or transmission signals are often transmitted to a plurality of individual circuit parts controlling the antennas. Different conductive path lengths to the different circuit parts may result in different phase offsets. However, precisely controlling phase differences between the different antennas is important for the operation of the phased array. Therefore, it is desirable to be able to measure the phase offsets generated by different conductive path lengths, so they can be taken into account for example when controlling adjustable phase shifters.

SUMMARY

According to an embodiment, a radio frequency (RF) device is provided, comprising: a first RF circuit part, a second RF circuit part, a signal connection coupling the first RF circuit part to the second RF circuit part, a reference line configured to supply the first RF circuit part and the second RF circuit part with a reference signal, wherein the first RF circuit part is configured to generate a first test signal based on the reference signal and to transmit the first test signal via the signal connection, wherein the second RF circuit part is configured to measure a first phase difference between the first test signal received via the signal connection and the reference signal, wherein the second RF circuit part is configured to generate a second test signal based on the reference signal and transmit the second test signal via the signal connection, wherein the first RF circuit part is configured to measure a second phase difference between the second test signal received via the signal connection and the reference signal, and wherein the RF device is configured to determine at least one of a phase offset caused by the signal connection or a phase offset caused by a reference line providing the reference signal based on the first phase difference and the second phase difference.

According to another embodiment, a method is provided, comprising: generating a first test signal at a first radio frequency (RF) circuit part based on a reference signal, measure a first phase difference between the first test signal and the reference signal at a second RF circuit part, generating a second test signal at the second RF circuit part based on the reference signal, measuring a second phase difference between the second test signal and the reference signal at the first RF circuit part, and determining at least a phase offset of at least one of a connection transmitting the first and second test signals between the first and second RF circuit parts or a reference line providing the reference signal based on the first phase difference and the second phase difference. In various embodiments, possibilities for performing phase offset measurements are provided.

The above summary is merely intended to give a brief overview over some embodiments and is not to be construed as limiting.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
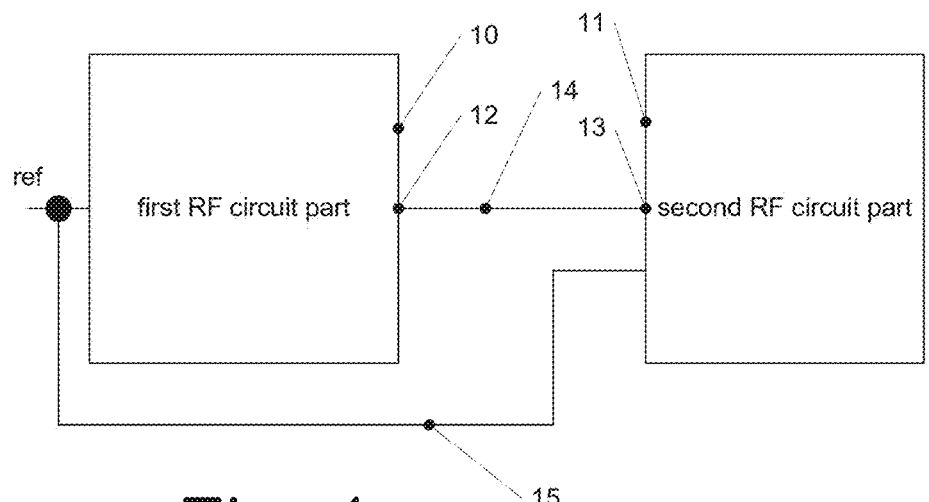
FIG. 1 is a block diagram of a radio frequency device according to an embodiment.

In the following, various embodiments will be described in detail referring to the attached drawings. It should be noted that these embodiments are given by way of example only and are not to be construed as limiting. For example, while embodiments may be described comprising numerous features or elements, in other embodiments some of these features or elements may be omitted, and/or may be replaced by alternative features or elements. Also, apart from features or elements explicitly shown in the drawings or described herein, further features or elements, for example features or elements conventionally used in phased array systems, may be provided.

Features from different embodiments may be combined to form further embodiments unless noted otherwise. Variations or modifications described with respect to one of the embodiments may also be applicable to other embodiments.

Turning now to the figures, FIG. 1 illustrates a radio frequency (RF) device according to an embodiment. The embodiment of FIG. 1 comprises a first radio frequency (RF) circuit part 10 and a second radio frequency (RF) circuit part 11. A reference clock signal ref is supplied both to the first and second radio frequency circuit parts 10, 11 via a reference line 15. The reference clock signal may be a central system clock signal, providing a synchronization frequency to first and second RF circuit parts 10, 11 and possibly to other parts of a system comprising the device of FIG. 1. For example, in 5G communication systems a frequency of the reference clock signal may be around 122 MHz, but is not limited thereto. Furthermore, first RF circuit part transmits a signal to second RF circuit part 11 via a connection 14. In some embodiments, first RF circuit part 10 may be coupled to baseband circuitry to transmit a baseband signal to and/or receive a baseband signal from the baseband circuitry. The baseband signal may be an analog or a digital signal. In some embodiments, second RF circuit part 11 may be coupled to an antenna to wirelessly transmit and/or receive signals.

In some embodiments, the signal transmitted via connection 14 may be a communication signal, for example a wideband signal around 28 GHz in case of a 5G communication system, for example a transmit signal generated or converted in first RF circuit part 10 and provided to an antenna, for example in a phased array, by second RF circuit part 11. In other embodiments, a receive signal may be transmitted as communication signal from second RF circuit part 11 to first RF circuit part 10 via connection 14.

Transmission via connection 14 generates a first phase offset $\Delta\phi 1$. Furthermore, transmission of the reference signal via reference line 15 to second RF circuit part 11 generates a second phase offset $\Delta\phi 2$. In embodiments, it is desirable to know these phase differences $\Delta\phi 1$, $\Delta\phi 2$, for example to take them into account when adjusting phases in a phased array.

To measure the phase offsets $\Delta\phi 1$, $\Delta\phi 2$, in some embodiments a test signal s1 is generated based on the reference signal ref and injected at a node 12 (output node of first RF circuit part 10), and a phase difference phase1 between the signal s1 and the reference signal ref is measured at a node 13, i.e. at the second RF circuit part 11. phase1 is then equal to $$\text{phase1}=(\phi\text{ref}+\Delta\phi 1)-(\phi\text{ref}+\Delta\phi 2). \tag{1}$$

In equation 1, $\phi$ref is the phase of reference signal ref at first circuit part 10, and hence also of signal s1 at node 12 (as s1 is based on reference signal ref). The second bracket of equation (1) $\phi\text{ref}+\Delta\phi 2$ represents the phase of signal ref at node 13, i.e. at second RF circuit part 11 (after having been transmitted via connection 15), while the first term in equation (1) $\phi\text{ref}+\Delta\phi 1$ represents the phase of the test signal injected at node 12 at the second RF circuit part (node 13), where the phase is increased by $\Delta\phi 1$.

Then, a second measurement is performed, where a second test signal s2 based on reference signal ref (which at node 13 has undergone a phase delay $\Delta\phi 2$) is injected at node 13, and a phase difference phase2 between this signal s2 and signal ref is measured at first RF circuit part (node 12). For this phase difference phase2, the following applies:

$$\text{phase2}=(\phi\text{ref}+\Delta\phi 2+\Delta\phi 1)-\phi\text{ref}. \tag{2}$$

The terms in brackets in equation (2) represent the phase of test signal s2 at node 12 (ref first is subjected to phase difference $\Delta\phi 2$ on line 15, and then the test signal generated based on this signal additionally experiences phase difference $\Delta\phi 1$ when travelling via connection 14), and the term after the minus represents the phase of the reference signal ref at node 12, i.e. first RF circuit part 10. Equation (i) may also be written as:

$$\text{phase1}=\Delta\phi 1-\Delta\phi 2, \tag{3}$$

and equation (2) may also be written as $$\text{phase2}=\Delta\phi 2+\Delta\phi 1. \tag{4}$$

From the measured results phase1 and phase2, $\Delta\phi 1$ and $\Delta\phi 2$ may be calculated according to $$\Delta\phi 2=(\text{phase 1}-\text{phase 2})/2 \tag{5}$$

$$\Delta\phi 1=(\text{phase 2}+\text{phase 1})/2. \tag{6}$$

In this way, the phase differences of connections 14 and line 15 may be measured and for example taken into account in a phased array. It should be noted that for measuring the phase differences phase1 and phase2, any conventional suitable phase detectors like quadrature phase detectors may be used. In some implementations, for example in phased arrays, such phase detectors may already be present for other purposes, for example for built-in self-test and self-calibration of the phased array system. Furthermore, for generating the test signals s1, s2, based on signal ref transceiver capabilities of first and second RF circuits 10, 11 may be used which otherwise are used for transmitting signals between RF circuit parts 10, 11.

The above-described calculations may for example be implemented in first circuit part 10 and/or second circuit part 11 using one or more correspondingly programmed processors, application specific integrated circuits (ASICs), logic circuits, digital signal processors or any other suitable software, hardware, firmware or combinations thereof.

It should be noted that in case only one of phase offsets $\Delta\phi 1$, $\Delta\phi 2$ is of interest, only the respective phase offset needs to be calculated.

Next, example environments where the techniques discussed above for determining phase differences will be discussed referring to FIGS. 2 and 3.

Figure 2:
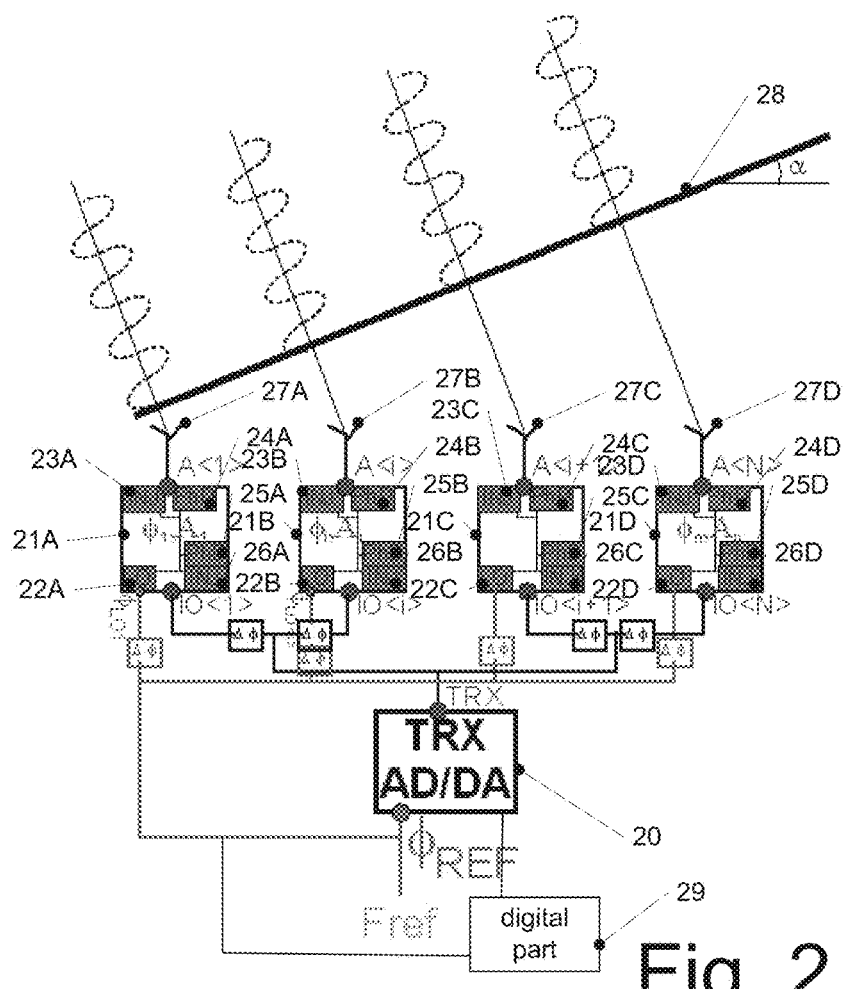
FIG. 2 is a diagram of a phased array system according to an embodiment.
Figure 3:
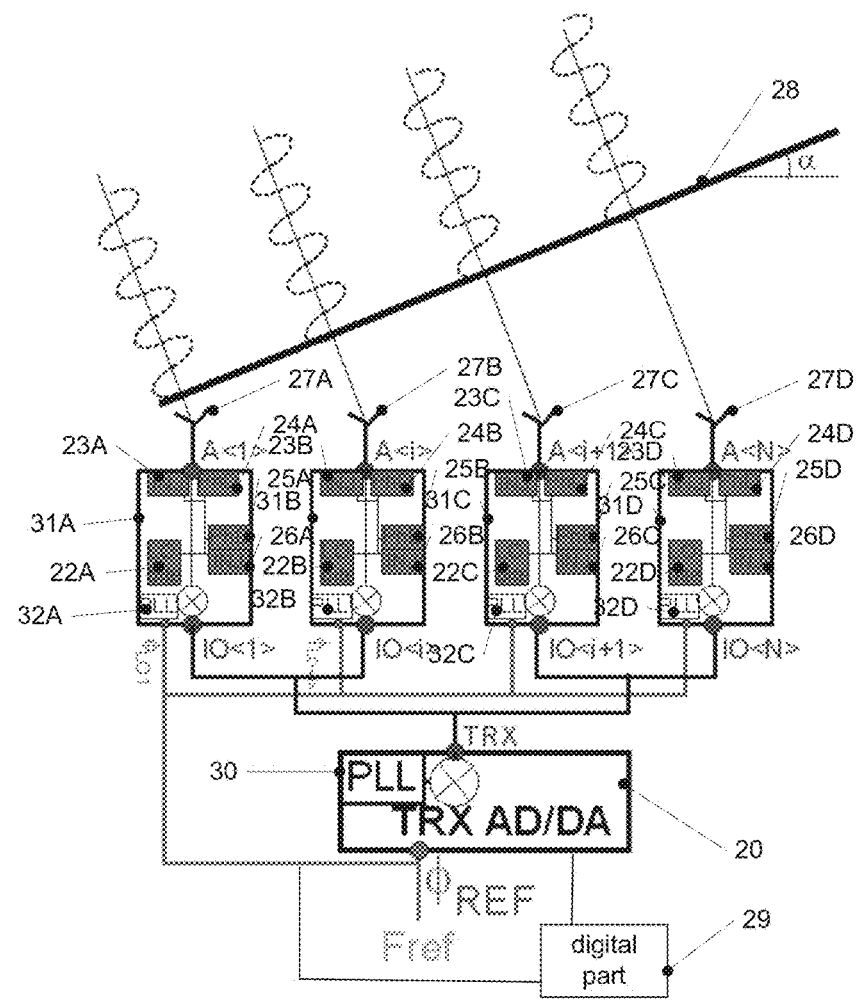
FIG. 3 is a block diagram of a phased array system according to an embodiment.

As non-limiting example environments, FIGS. 2 and 3 show phased array systems. In FIGS. 2 and 3, in order to avoid repetitions, corresponding or similar elements are denoted with the same reference numerals and will not be described twice. Furthermore, elements which occur in the systems a plurality of times are designated with the same number followed by a letter (A, B, . . . ) and are collectively referred to by the number only (for example a reference to numeral 21 collectively refers to elements 21A, 21B . . . ).

In the phased array system of FIG. 2, for transmission a transmission/reception (TRX) analog-to-digital (AD)/digital-to-analog (DA) converter 20 converts a digital representation of a signal to be transmitted received from a digital part 29, for example a digital signal processor (DSP), into an analog representation of the signal and transmits it to a plurality of phased array circuits 21, in the example of FIG.

2 four phased array circuits 21A to 21D. The number of four phased array circuits 21 in FIG. 2 is merely an example, and any number of phased array circuits 21 may be provided, for example up to several hundreds of such phased array circuits. In the example system of FIG. 2, each phased array circuit 21 controls a respective antenna 27. The analog transmit signal provided by TRX AD/DA 20 to each of phased array circuits 21 is adjusted with respect to phase φ and amplitude A in each of phased array circuits 21 versus the respective IO signal individually, such that signals with individually adjusted phases and amplitudes are transmitted by antennas 27. This is indicated by φ1 ... φn and A1 ... An in FIG. 2. Through constructive and destructive interference, this leads to beamforming. In the example of FIG. 2, a wave front 28 forming an angle α to a direction defined by a plane in which antennas 27 are provided is formed. However, this is merely a non-limiting example. Phased array circuits 21 may further perform, when transmitting signals, a frequency upconversion to a radio frequency used for transmission.

When distributing the analog transmit signal from TRX AD/DA 20 to circuits 21, as indicated in FIG. 2 different phase offsets Δφ1 may occur due to different line length to circuits 21, which in embodiments are taken into account when adjusting the phase in circuits 21. Furthermore, phase offsets Δφ2 may occur when providing a reference signal Fref to circuits 21. Offset Δφ1, Δφ2 may be determined using techniques disclosed herein.

It should be noted that one or more circuits 21 may be integrated in a single chip, but may also be provided as separate chips. Often, in enlarged phased arrays having even some hundreds of antennas, a plurality of phased array chips are used, each serving a subset (i.e. one or more) of the antennas.

For receiving signals, signals received via antennas 27 are adjusted regarding amplitude and phase and possibly down converted to an intermediate frequency from a RF reception frequency. The signals adjusted in this manner are combined and provided to TRX AD/DA 20. Through constructive and destructive interference, the combination leads to a desired reception characteristic, for example a direction sensitive reception characteristic.

Furthermore, the phased array circuits 21 in the example of FIG. 2 each comprises built-in testing equipment (BITE) to measure and calibrate phase differences between the different phased array circuits 21. To this end, phased array circuits 21 comprise a first test signal injector 23, a second test signal injector 26, phase detectors 24, 25 and a local oscillator 22. Local oscillators 22 generate a local oscillator signal based on a signal as Ref supplied to all local oscillator circuits 22. Through different path lengths, phase differences Δφ may result in the signal Fref as provided to the local oscillator circuits 22. The components discussed above may be controlled by a digital interface (not explicitly shown in FIG. 2) to control local oscillator signal generation, signal injection and reading out phase/amplitude detectors 24, 25. Generally, for measuring relative phases, test signals are generated by injectors 23A, 26A and sent through the various signal paths, and phase/amplitude references measured by phase detectors 24, 25 which may be implemented for example as quadrature phase detectors. This calibration itself may be performed in any conventional manner and allows calibration of the system illustrated in FIG. 2.

The local oscillator signal generated by local oscillator circuit 22 for such measurement may serve as a reference for phase detectors 24, 25. In addition, the local oscillator signal generated by local oscillators circuits 22 may also be used for other purposes in the circuit of FIG. 2, for example for up/downconversion. Local oscillator circuits 21 each may comprise a phase locked loop circuit to generate the PLL circuit, the signal Fref serving as a reference signal for the PLL.

As mentioned above, the phase differences Δφ1, Δφ2 in the system of FIG. 2 may be determined using techniques disclosed herein, in particular using an approach as already discussed with reference to FIG. 1 and with reference to equations (1) to (6). The signal Fref here corresponds to the reference signal ref of FIG. 1. A first measurement is performed by injecting a test signal at a node labeled TRX in FIG. 2, for example by using internal signal generation/transmission circuitry of TRX AD/DA 20. The phase difference relative to the signal Fref is then measured at the phased array circuits 21, for example at the input/output nodes IO<1> to IO<N>. For the second measurement, the test signal is injected at a node IO(i) for the respective path to be measured, and the phase difference is measured at TRX AD/DA 20, i.e. for the signal at node TRX. By these two measurements, in the manner explained above referring to equations (1) to (6), the phase offsets induced by the respective conductive signal path can be determined. This procedure may be performed for each of phased array circuits 21.

In FIG. 3, a variation of the system of FIG. 2 is discussed. To avoid repetitions, elements corresponding to elements already described with reference to FIG. 2 bear the same reference numeral and will not be described again in detail.

In the system of FIG. 3, a frequency required as intermediate frequency for up/downconversion differs from a frequency used for testing purposes. This may be the case for example in some fifth generation (5G) mobile phone/network systems which distribute signals at an intermediate frequency around 3 to 6 GHz instead of 28 GHz. In this case, local oscillator circuits 22 are only used as reference for testing purposes. For up/downconversions, additional PLL circuits 32 are provided in phased array circuits 31, and an additional PLL is provided in TRX AD/DA 20. The additional PLLs 30, 32 are associated with mixers, as shown in FIG. 3.

Also the system of FIG. 3, phase offsets Δφ1, Δφ2 may be measured as discussed above.

Figure 4:
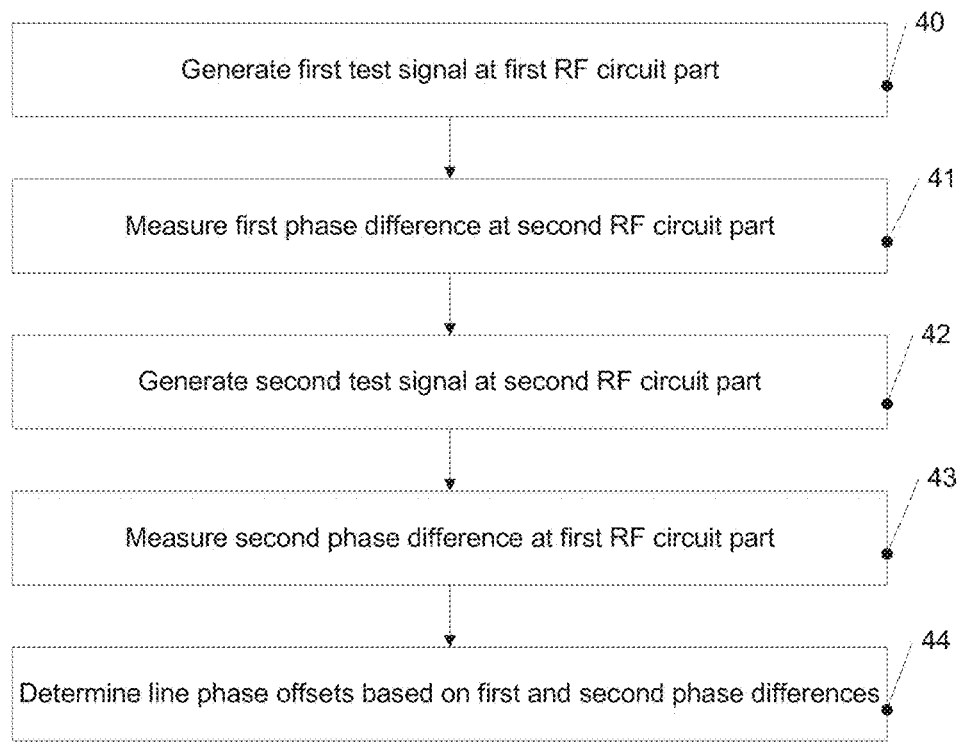
FIG. 4 is a flowchart illustrating a method according to an embodiment.

FIG. 4 is a flowchart illustrating a method according to an embodiment. The method of FIG. 4, for ease of explanation, will be described referring to FIGS. 1-3 and may be implemented using the devices and systems of FIGS. 1-3, but is not limited thereto. Furthermore, while the method is shown and will be described as a series of acts or events, the order in which these acts or events is shown and described is not to be construed as limiting.

At 40, the method comprises generating a first test signal based on a reference signal at a first radio frequency circuit part, for example first radio frequency circuit part 10 of FIG. 1 or TRX AD/DA 20 of FIGS. 2 and 3.

At 41, the method comprises measuring a first phase difference at a second RF circuit part, for example second RF circuit part 11 of FIG. 1 or any one of first phased array circuits 21, 31 of FIG. 2 or 3. The phase difference is measured between the test signal received at the second RF circuit part and the reference signal as received at the second RF circuit part.

At 42, the method comprises generating a second test signal at the second RF circuit part based on the reference signal. At 43, the method comprises measuring a second phase difference at the first RF circuit part between the second test signal as received at the first RF circuit part and the reference signal as received at the first RF circuit part.

At 44, the method then comprises determining phase offsets of connections and lines where the first and second test signals and the reference signals have been transmitted based on the first and second phase differences, for example based on equations (5) and (6), as explained above.

Next, with reference to FIGS. 5A and 5B phased array systems with different distribution schemes for providing a transmit signal or receiving a receive signal to/from a plurality of phased array circuits associated with a plurality of antennas will be discussed. Similar distribution schemes may be applied to distributing a reference signal like signal Fref of FIGS. 2 and 3.

Figure 5A:
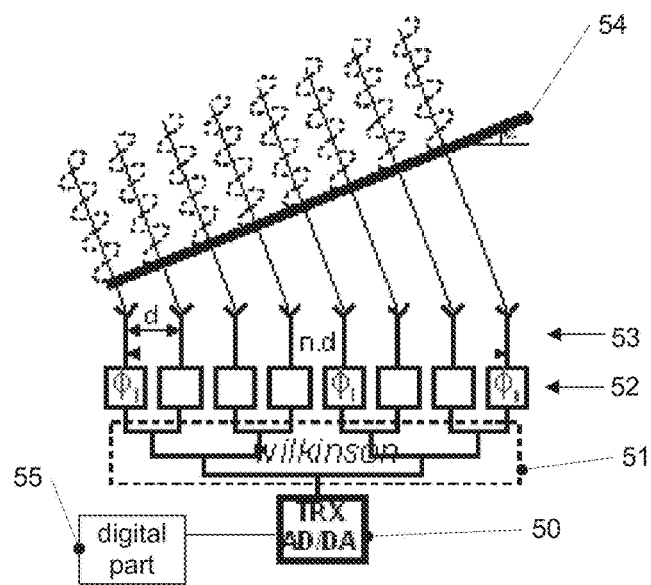
FIGS. 5A and 5B are diagrams illustrating phased array systems according to some embodiments.

In FIG. 5A, a signal from a TRX AD/DA 50, which may serve the same functions as described for TRX AD/DA 20 of FIGS. 2 and 3, is distributed to or collected from a plurality of phased array circuits 52 associated with a corresponding plurality of antennas 53 spaced apart a distance d. TRX AD/DA 50 receives a digital signal from and/or provides a digital signal to a digital part 55, for example a digital signal processor (DSP) or other digital circuitry. Phased array circuits 52 may serve similar functions as the phased array circuits 21 of FIG. 2 or 31 of FIG. 3 and provide phase and/or amplitude modulations to the signals to obtain for example a desired wavefront 54.

The signal is distributed from TRX AD/DA 50 to phased array circuits 52 or collected from phased array circuits 52 to TRX AD/DA 50 via a Wilkinson Tree 51. In case the Wilkinson Tree is exactly symmetric, the phase differences for all phased array circuits 52 would be the same. However, deviations from symmetry may lead to different phase offsets, which may be determined based on the techniques described above.

Figure 5B:
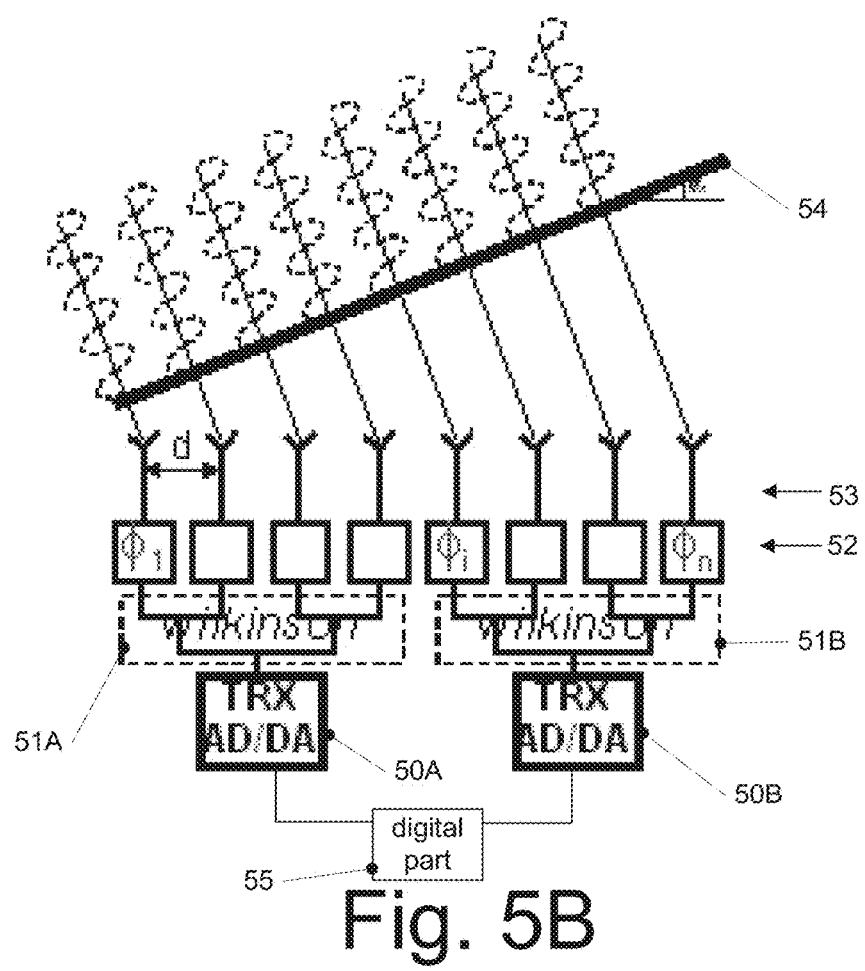

FIG. 5B is a variation of the arrangement of FIG. 5A, where two TRX AD/DAs 50A, 50B are used, each being coupled to a subset of phased array circuits 52 via a Wilkinson Tree 51A, 51B, respectively. Other variations, for example different numbers of TRX AD/DAs or different numbers of phased array circuits 52, are also possible. Apart from a symmetric tree also other distributions, for example with only a single node splitting the signal into signals for a plurality of phased array circuits, are possible. In view of these variations and modifications, it is noted again that the above-described embodiments are not to be construed as limiting in any way.

The following examples are example embodiments.

Example 1

A radio frequency device, comprising: a first radio frequency circuit part (10; 20), a second radio frequency circuit part (11; 21; 31), a signal connection (14) coupling the first radio frequency circuit part (10; 20) to the second radio frequency circuit part (11; 21; 31), a reference line (15) configured to supply the first radio frequency circuit part (10; 20) and the second radio frequency circuit part (11; 21; 31) with a reference signal, wherein the first radio frequency circuit part (10; 20) is configured to generate a first test signal (s1) based on the reference signal and to transmit the first test signal via the signal connection (14), wherein the second radio frequency circuit part is configured to measure a first phase difference between the first test signal received via the signal connection (14) and the reference signal, wherein the second radio frequency circuit part is configured to generate a second test signal (s2) based on the reference signal and transmit the second test signal via the signal connection (14), wherein the first radio frequency circuit part is configured to measure a second phase difference between the second test signal received via the signal connection (14) and the reference signal, and wherein the radio frequency device is configured to determine at least one of a phase offset caused by the signal connection or a phase offset caused by a reference line providing the reference signal based on the first phase difference and the second phase difference.

Example 2

The radio frequency device of example 1, wherein determining the phase offset comprises adding the first and second phase differences.

Example 3

The radio frequency device of example 1, wherein determining the offset comprises subtracting one of the first and second phase differences from the other one of the first and second phase differences.

Example 4

The device of example 1, wherein the radio frequency device is at least part of a phased array device.

Example 5

The radio frequency device of example 4, wherein the first radio frequency circuit part comprises at least one of a digital-to-analog or an analog-to-digital converter, and the second radio frequency circuit part is a phased array circuit part to be coupled to an antenna of a phased array.

Example 6

The device of example 5, comprising a plurality of second radio frequency circuit parts comprising the radio frequency circuit part, each of the plurality of second radio frequency circuit parts to be coupled to at least one antenna.

Example 7

The device of example 1, wherein the signal connection (14) is part of a Wilkinson Tree connection.

Example 8

The device of example 1, wherein the reference signal is a system clock signal.

Example 9

The device of example 1, wherein the signal connection is configured to carry a radio frequency communication signal.

Example 10

A method, comprising: generating a first test signal at a first radio frequency radio frequency circuit part based on a reference signal, measure a first phase difference between the first test signal and the reference signal at a second radio frequency circuit part, generating a second test signal at the second radio frequency circuit part based on the reference signal, measuring a second phase difference between the second test signal and the reference signal at the first radio frequency circuit part, and determining at least a phase offset of at least one of a connection transmitting the first and second test signals between the first and second radio frequency circuit parts or a reference line providing the reference signal based on the first phase difference and the second phase difference.

Example 11

The method of example 10, wherein the determining comprises adding the first phase difference to the second phase difference.

Example 12

The method of example 10, wherein the determining comprises subtracting one of the first and second phase difference from the other one of the first and second phase difference.

Example 13

The method of example 10, wherein the first radio frequency circuit part and the second radio frequency circuit part are parts of a phased array system.

Example 14

The method of example 10, wherein the reference signal is a system clock signal.

Example 15

The method of example 10, wherein generating the first test signal and/or generating the second test signal comprises transmitting the first test signal and/or the second test signal over a communication connection used for transmitting a radio frequency communication signal.

What is claimed is:
1. A radio frequency device, comprising:
a first radio frequency circuit part configured to be coupled to baseband circuitry;
a second radio frequency circuit part configured to be coupled to an antenna;
a signal connection coupling the first radio frequency circuit part to the second radio frequency circuit part, wherein
the first radio frequency circuit part is configured to provide a first signal to the second radio frequency circuit part via the signal connection based on a first baseband signal received from the baseband circuitry, and the second radio frequency circuit part is configured to transmit a first radio frequency signal based on the first signal, or
the second radio frequency circuit part is configured to receive a second radio frequency signal from the antenna and provide a second signal to the first radio frequency circuit part via the signal connection based on the second radio frequency signal, and the first radio frequency circuit part is configured to provide a second baseband signal to the baseband circuitry based on the second signal; and
a reference line configured to supply the first radio frequency circuit part and the second radio frequency circuit part with a reference signal, wherein the reference line is separate from the signal connection,
wherein the first radio frequency circuit part is configured to generate a first test signal based on the reference signal and to transmit the first test signal via the signal connection,
wherein the second radio frequency circuit part is configured to measure a first phase difference between the first test signal received via the signal connection and the reference signal received via the reference line,
wherein the second radio frequency circuit part is configured to generate a second test signal based on the reference signal and transmit the second test signal via the signal connection,
wherein the first radio frequency circuit part is configured to measure a second phase difference between the second test signal received via the signal connection and the reference signal received via the reference line, and
wherein the radio frequency device is configured to determine at least one of a phase offset caused by the signal connection or a phase offset caused by the reference line providing the reference signal based on the first phase difference and the second phase difference.

2. The radio frequency device of claim 1, wherein determining the phase offset caused by the signal connection comprises adding the first and second phase differences.

3. The radio frequency device of claim 1, wherein determining the phase offset caused by the reference line comprises subtracting one of the first and second phase differences from the other one of the first and second phase differences.

4. The radio frequency device of claim 1, wherein the radio frequency device is at least part of a phased array device.

5. The radio frequency device of claim 4, wherein the first radio frequency circuit part comprises at least one of a digital-to-analog or an analog-to-digital converter, and the second radio frequency circuit part is a phased array circuit part to be coupled to the antenna, wherein the antenna comprises a phased array antenna.

6. The radio frequency device of claim 5, comprising a plurality of second radio frequency circuit parts comprising the second radio frequency circuit part, each of the plurality of second radio frequency circuit parts to be coupled to at least one antenna.

7. The radio frequency device of claim 1, wherein the signal connection is part of a Wilkinson Tree connection.

8. The radio frequency device of claim 1, wherein the reference signal is a system clock signal.

9. The radio frequency device of claim 1, wherein:
the first radio frequency signal and the second radio frequency signal are different from the first test signal and the second test signal.

10. The radio frequency device of claim 9, wherein the first radio frequency signal and the second radio frequency signal each comprises a wideband communication signal.

11. A method, comprising:
performing the steps of:
receiving, by a first radio frequency circuit part, a baseband signal from baseband circuitry, providing a first signal to a second radio frequency circuit part based on the baseband signal via a signal connection, and transmitting, by the second radio frequency circuit part, a first radio frequency signal based on the first signal to an antenna, or receiving, by the second radio frequency circuit part, a second radio frequency signal from the antenna, providing a second signal to the first radio frequency circuit part based on the second radio frequency signal via the signal connection, and providing, by the first radio frequency circuit part, a second baseband signal to the baseband circuitry based on the second signal;

generating a first test signal at the first radio frequency circuit part based on a reference signal provided by a reference line separate from the signal connection;

transmitting the first test signal from the first radio frequency circuit part to the second radio frequency circuit part via the signal connection;

measuring a first phase difference between the first test signal received via the signal connection and the reference signal received via the reference line at the second radio frequency circuit part;

generating a second test signal at the second radio frequency circuit part based on the reference signal provided by the reference line;

transmitting the second test signal from the second radio frequency circuit part to the first radio frequency circuit part via the signal connection;

measuring a second phase difference between the second test signal received via the signal connection and the reference signal received via the reference line at the first radio frequency circuit part; and determining at least a phase offset of at least one of a connection transmitting the first and second test signals between the first and second radio frequency circuit parts or the reference line providing the reference signal based on the first phase difference and the second phase difference.

12. The method of claim 11, wherein the determining comprises adding the first phase difference to the second phase difference.

13. The method of claim 11, wherein the determining comprises subtracting one of the first and second phase difference from the other one of the first and second phase difference.

14. The method of claim 11, wherein the first radio frequency circuit part and the second radio frequency circuit part are parts of a phased array system.

15. The method of claim 11, wherein the reference signal is a system clock signal.

16. The method of claim 11, wherein the first radio frequency signal and the second radio frequency signal are different from the first test signal and the second test signal.

17. The method of claim 16, wherein the first radio frequency signal or the second radio frequency signal comprises a wideband communication signal.

* * * * *